US011138417B2

(12) United States Patent
Binsaadoon et al.

(10) Patent No.: US 11,138,417 B2
(45) Date of Patent: Oct. 5, 2021

(54) AUTOMATIC GENDER RECOGNITION UTILIZING GAIT ENERGY IMAGE (GEI) IMAGES

(71) Applicant: King Fahd University of Petroleum and Minerals, Dhahran (SA)

(72) Inventors: Amer Ghazi Abdullah Binsaadoon, Dhahran (SA); El-Sayed M. El-Alfy, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/393,397

(22) Filed: Apr. 24, 2019

(65) Prior Publication Data

US 2020/0342216 A1    Oct. 29, 2020

(51) Int. Cl.
| G06K 9/00 | (2006.01) |
| G06K 9/62 | (2006.01) |
| G06K 9/46 | (2006.01) |

(52) U.S. Cl.
CPC ....... G06K 9/00348 (2013.01); G06K 9/4642 (2013.01); G06K 9/6256 (2013.01)

(58) Field of Classification Search
CPC . G06K 9/00348; G06K 9/4642; G06K 9/6256
See application file for complete search history.

(56) References Cited

U.S. PATENT DOCUMENTS

| 8,626,472 B2 * | 1/2014 | Solinsky ............. A61B 5/4076 |
| | | 702/160 |
| 9,928,406 B2 | 3/2018 | Bhanu et al. |
| 10,140,506 B2 | 11/2018 | Binsaadoon et al. |
| 2016/0189149 A1 * | 6/2016 | MacLaurin ...... G06Q 20/40145 |
| | | 705/44 |
| 2018/0082113 A1 * | 3/2018 | Binsaadoon ....... G06K 9/00342 |
| 2019/0156113 A1 * | 5/2019 | Binsaadoon ......... G06K 9/4614 |
| 2019/0392922 A1 * | 12/2019 | Bader ................... G16H 20/40 |

FOREIGN PATENT DOCUMENTS

CN         106096532 A      11/2016

OTHER PUBLICATIONS

Yang, et al. ; Gabor Phase Based Gait Recognition ; Electronics letters vol. 44, No. 10 ; May 8, 2008 ; 2 Pages.
Felez, et al. ; A Gender Recognition Experiment on the CASIA Gait Database Dealing with Its Imbalanced Nature. ; VISAPP 2010—International Conference on Computer Vision Theory and Applications ; Jan. 2010 ; 7 Pages.
Han, et al. ; Individual Recognition Using Gait Energy Image ; IEEE Transactions on pattern analysis and machine intelligence, vol. 28, No. 2 ; Feb. 2006 ; 7 Pages.

(Continued)

*Primary Examiner* — Pakee Fang
(74) *Attorney, Agent, or Firm* — Oblon, McClelland, Maier & Neustadt, L.L.P.

(57) ABSTRACT

Methods, systems, and computer readable media for methods, computer readable media, and systems for automatic gender recognition including a phase quantization feature extraction method for automatic gender recognition in smart environments are described.

14 Claims, 3 Drawing Sheets

(a)

(b)

(56) References Cited

OTHER PUBLICATIONS

Wang, et al. ; Silhouette Analysis-Based Gait Recognition for Human Identification ; IEEE Transactions on Pattern Analysis and Machine Intelligence, vol. 25, No. 12 ; Dec. 2003 ; 14 Pages.
Yoo, et al. ; Gender Classification in Human Gait Using Support Vector Machine ; ACIVS 2005, LNCS 3708 ; pp. 138-145 ; 2005 ; 8 Pages.
Huang, et al. ; Gait recognition based on Gabor wavelets and modified gait energy image for human identification ; Journal of Electronic Imagining 22(4) ; Oct. 2013 ; 12 Pages.
Yang, et al. ; Gait recognition based on dynamic region analysis ; Signal Processing 88 (2008) ; pp. 2350-2356 ; Mar. 18, 2008 ; 7 Pages.
Lishani ; Person Recognition Using Gait Energy Imaging ; Doctoral Thesis, Northumbria University ; 2018 ; 151 Pages.

\* cited by examiner

AUTOMATIC GENDER RECOGNITION UTILIZING GAIT ENERGY IMAGE (GEI) IMAGES

STATEMENT OF PRIOR DISCLOSURE BY AN INVENTOR

Aspects of the present disclosure are described in Binsaadoon A.G., El-Alfy ES.M. (2018) "Enhanced Method for Recognizing Gender In Smart Environments from Gait Recognition," In: Smart Cities Symposium (SCS 2018), IET Conference Proceedings, DOI: 10.1049/cp.2018.1402. IET Digital Library, incorporated herein by reference in its entirety.

BACKGROUND

Technical Field

The present disclosure is directed generally to machine vision, and, more particularly, to methods, computer readable media, and systems for automatic gender recognition including a phase quantization feature extraction method for automatic gender recognition in smart environments.

Background

The cognitive excellence of human brain to recognize human gender at a distance has urged researchers to propose and develop numerous sophisticated computational methods relying on different human biometrics. Automatic gender recognition can play an important role in many social and commercial applications.

Correct gender perception can improve the quality of demographic studies, help decision makers in marketing analysis, leverage visual surveillance systems, and contribute in understanding numerous medical and psychological behaviors of male and female persons. Moreover, in big data biometric-based systems, it might be difficult to achieve high accuracy with a fast response time. Hence, automatic gender classification can serve as a preliminary screening test to split the large number of subjects to reduce the search space. (See, Jeff P. Foster, Mark S. Nixon, and Adam Prugel-Bennett. *Automatic gait recognition using area-based metrics*. Pattern Recognition Letters, 24(14):2489-2497, 2003, which is incorporated herein by reference).

Automating gender recognition based on human gait biometrics is a developing area of technology. (See, Maodi Hu, Yunhong Wang, Zhaoxiang Zhang, and Yiding Wang. *Combining spatial and temporal information for gait based gender classification*. In 20th International Conference on Pattern Recognition (ICPR), pages 3679-3682, 2010; Xuelong Li, S. J. Maybank, Shuicheng Yan, Dacheng Tao, and Dong Xu. *Gait components and their application to gender recognition*. IEEE Transactions on Systems, Man, and Cybernetics, Part C: Applications and Reviews, 38(2):145-155, 2008; and Jang-Hee Yoo, Doosung Hwang, and Mark S Nixon. *Gender classification in human gait using support vector machine*. In Advanced concepts for intelligent vision systems, pages 138-145. Springer, 2005, which are incorporated herein by reference). Most of the previous attempts utilized face and voice biometric traits. (See, Caifeng Shan. *Learning local binary patterns for gender classification on real-world face images*. Pattern Recognition Letters, 33(4): 431-437, 2012; Y. Saatci and C. Town. *Cascaded classification of gender and facial expression using active appearance models*. In IEEE 7th International Conference on Automatic Face and Gesture Recognition, pages 393-398; A. Jain and J. Huang. *Integrating independent components and linear discriminant analysis for gender classification*. In Proceedings of Sixth IEEE International Conference on Automatic Face and Gesture Recognition, pages 159-163, 2004; Hui-Cheng Lian and Bao-Liang Lu. *Multi-view gender classification using local binary patterns and support vector machines*. In Advances in Neural Networks—ISNN, volume 3972 of Lecture Notes in Computer Science, pages 202-209. Springer Berlin Heidelberg, 2006; and H. Harb and Liming Chen. *Gender identification using a general audio classifier*. In Proceedings International Conference on Multimedia and Expo (ICME'03), volume 2, pages 733-736, 2003, which are incorporated herein by reference).

Gait has numerous salient features compared to conventional biometrics that can help make gait a good candidate to be utilized separately or to compliment other biometrics. Gait can reliably work at a distance even in uncontrolled environments lacking person cooperation with the capturing devices. Also, gait can include more physiological information than conventional biometrics so that it can be more effective in gender and race recognition. Moreover, gait biometrics can be difficult to disguise and can be learned from low-resolution videos.

Gait-based gender recognition processes can be degraded in terms of accuracy by effects of ambient changes and gait related challenges. Some of these factors are external such as walking surface, shoes type, object carrying, clothes, lighting, viewing angle, environment (indoor or outdoor), walking speed, and image quality. Other factors may change the subject's walking pattern due to physical or physiological conditions such as injuries, limb disabilities, gait related diseases (e.g. Parkinson's disease), mental disabilities, pregnancy, and body weight changes.

Gabor representation has proved effective in feature extraction for numerous biometric-based applications. (See, Dacheng Tao, Xuelong Li, Xindong Wu, and S. J. Maybank. *General tensor discriminant analysis and Gabor features for gait recognition*. IEEE Transactions on Pattern Analysis and Machine Intelligence, 29(10):1700-1715, October 2007, which is incorporated herein by reference). Features in a Gabor domain can be more robust against local distortion and noise and invariant to several subject covariates. Gabor representation has been applied to various biometrics such as face recognition, iris recognition, and gait recognition. (See, Chengjun Liu and H. Wechsler. *Gabor feature based classification using the enhanced fisher linear discriminant model for face recognition*. IEEE Transactions on Image Processing, 11(4):467-476, 2002; Linlin Shen and Li Bai. *A review on Gabor wavelets for face recognition*. Pattern Analysis and Applications, 9(2-3):273-292, 2006; L. Wiskott, J.-M. Fellous, Norbert Kruger, and C. von der Malsburg. *Face recognition by elastic bunch graph matching*. In Proceedings International Conference on Image Processing, volume 1, pages 129-132, 1997; Yingzi Du, Craig Belcher, and Zhi Zhou. *Scale invariant Gabor descriptor-based noncooperative iris recognition*. EURASIP J. Adv. Signal Process, pages 37:1-37:13, 2010; Deng-Yuan Huang, Ta-Wei Lin, Wu-Chih Hu, and Chih-Hsiang Cheng. *Gait recognition based on Gabor wavelets and modified gait energy image for human identification*. Journal of Electronic Imaging, 22(4), 2013; Maodi Hu, Yunhong Wang, Zhaoxiang Zhang, and Yiding Wang. *Combining spatial and temporal information for gait based gender classification*. In 20th International Conference on Pattern Recognition (ICPR), pages 3679-3682, 2010; Dacheng Tao, Xuelong Li, Xindong Wu, and S. J. Maybank. *General* tensor discriminant analysis and Gabor features for gait recognition. IEEE Transactions on Pattern Analysis and Machine Intelligence, 29(10):1700-1715, October 2007; and Xuelong Li, S. J. Maybank, Shuicheng Yan, Dacheng Tao, and Dong Xu. *Gait components and their application to gender recognition*. IEEE Transactions on Systems, Man, and Cybernetics, Part C: Applications and Reviews, 38(2): 145-155, 2008, which are incorporated herein by reference). However, Gabor responses may suffer from a limitation of dimensionality due to a large number of generated responses with high dimensions for each response. Several methods have been suggested to reduce Gabor feature dimensionality. For instance, Maodi et al. reduced the Gabor dimensionality using Maximization of Mutual Information (MMI) and obtained Gabor-MMI features for gait-based gender recognition. (See, M. Hu, Y. Wang, Z. Zhang, and Y. Wang. *Combining spatial and temporal information for gait based gender classification*. In 20th International Conference on Pattern Recognition, pages 3679-3682, 2010, which is incorporated herein by reference). Other methods utilized a Local Binary Patterns (LBP) texture operator to extract more distinguishing features from Gabor responses. (See, T. Ojala, M. Pietikainen, and T. Maenpaa. *Multiresolution grayscale and rotation invariant texture classification with local binary patterns*. IEEE Transactions on Pattern Analysis and Machine Intelligence, 24(7):971-987, July 2002, which is incorporated herein by reference). Several authors have proposed Gabor features based on combining the LBP operator and its variants with the Gabor responses. For example, Wenchao et al. proposed local Gabor binary patterns (LGBP) for face recognition. (See, Wenchao Zhang, Shiguang Shan, Wen Gao, Xilin Chen, and Hongming Zhang. *Local Gabor binary pattern histogram sequence (LGBPHS): a novel non-statistical model for face representation and recognition*. In Tenth IEEE International Conference on Computer Vision ICCV, volume 1, pages 786-791, 2005; and Wenchao Zhang, Shiguang Shan, Laiyun Qing, Xilin Chen, and Wen Gao. *Are Gabor phases really useless for face recognition?* Pattern Analysis and Applications, 12(3):301-307, 2009, which are incorporated herein by reference). Similarly, Zhang et al. proposed a histogram of Gabor phase pattern (HGPP) that captures the variations in Gabor phase of face images. (See, Baochang Zhang, Shiguang Shan, Xilin Chen, and Wen Gao. *Histogram of Gabor phase patterns (HGPP): A novel object representation approach for face recognition*. IEEE Transactions on Image Processing, 16(1):57-68, 2007, which is incorporated herein by reference). Xie et al. proposed local Gabor XOR patterns (LGXP) that utilize a local XOR pattern (LXP) operator to encode Gabor phase variations for face recognition purpose. (See, Shufu Xie, Shiguang Shan, Xilin Chen, and Jie Chen. *Fusing local patterns of Gabor magnitude and phase for face recognition*. IEEE Transactions on Image Processing, 19(5):1349-1361, 2010, which is incorporated herein by reference).

U.S. Pat. No. 9,928,406(B2) describes face-based individual recognition and emotion detection methods that are different from the gait-based gender recognition method described herein by the inventors. Face recognition usually requires high resolution images of faces and which is difficult to achieve in real applications related to video surveillance which breaches the core of video surveillance for security purposes. Gait-based recognition, unlike other biometrics like face and fingerprint, does not require the target subject to interact in a predefined and cooperative manner. Gait-based systems are non-intrusive and can work at longer distances (e.g. 10 m or more), unlike most of the other biometrics. Moreover, the gait modality is difficult to disguise and can be of low resolution. Unlike a face-based emotion detection method that apply dense SIFT to globally align the head/face region with each video frame, requiring a mathematically complicated and computationally heavy system, Gabor filters provide high degree of invariance to intensity, translation, and orientation and are not as sensitive to alignment. A Gait Energy Image (GEI) spatio-temporal gait representation summarizes all frames within one gait cycle into single image and preserves the temporal gait information of a gait sequence. As an average template, GEI is not sensitive to incidental silhouette errors in individual frames and permits discarding pixels with energy values lower than a threshold.

U.S. Pat. No. 10,140,506 (B2) encodes the gait features from GEI Gabor responses by extracting the statistical measures using a set of statistical features. Those statistical features are very sensitive to noise and image degradation factors. In case of small change in image intensities, translation or rotation, this may mislead the learning model which consequently provides wrong decisions. The present inventors apply Gabor filters on GEI image and then encode gait-based features using different feature extraction methods. For example, local phase quantization (LPQ) is robust to image degradation factors such as image blur.

CN106096532(A) describes a gait recognition method based on a tensor subspace learning using linear mapping matrix analysis and applied on GEI Gabor representation. The similarity measurements are calculated using Euclidean distance (ED) classifier. In the case of imbalanced designs (i.e. the number of objects in various classes are (highly) different), linear mapping matrix faces several problems. Also, the process of validating the linear mapping matrix is problematic and it is sensitive to overfit. In addition, linear mapping matrix is not applicable (inferior) for non-linear problems which make it not the first choice in plenary of common problems. Inventors describe a system that uses the Gait Energy Image (GEI) spatio-temporal gait representation which summarizes all frames within one gait cycle into a single image. Subsequently, Gabor-based local phase quantized features are extracted from a convolved representative GEI image without the need to perform time normalization due to the variation in gait cycle lengths for each gait sequence.

Some implementations of the present disclosure were conceived in light of the above mentioned problems and limitations of conventional machine translation techniques, methods and tools.

SUMMARY

Some implementations include applying Gabor magnitude for gait-based gender recognition. Some implementations include a gait-based Local Gabor Phase Quantization (LGPQ) descriptor, which encodes variations in the magnitude of Gabor responses by quantizing the phase information of a Fourier transform using a local-phase quantization (LPQ) operator.

Some implementations include constructing a Gait Energy Image (GEI) by averaging binary silhouettes within one gait cycle. (See, J. Han and B. Bhanu. *Individual recognition using gait energy image*. IEEE Transactions on Pattern Analysis and Machine Intelligence, 28(2):316-322, 2006, which is incorporated herein by reference). Then, the GEI image is convolved with a bank of Gabor filters to generate Gabor responses. After that, an LPQ operator is applied to extract features to train a linear-kernel SVM classifier. Compared to conventional techniques, better performance has been achieved by the disclosed technique on the multi-view CASIA B gait database. (See, Shiqi Yu, Daoliang Tan, and Tieniu Tan. *A framework for evaluating the effect of view angle, clothing and carrying condition on gait recognition*. In Proceedings of the 18th International Conference on Pattern Recognition (ICPR), volume 4, pages 441-444, 2006, which is incorporated herein by reference).

Some implementations can include a system to classify a subject as male or female based on gait. The system can include a camera configured to capture video of the subject, and one or more processors coupled to the camera and a nontransitory computer readable storage having software instructions stored thereon configured to cause the one or more processors to perform operations. The software instructions can cause the one or more processors to extract a representative feature vector by convolving Gait Energy Image (GEI) images with a Gabor filter bank to generate one or more Gabor responses, and encode high order texture information of the one or more Gabor responses using a local phase quantization (LPQ) operator. The software instructions can also cause the one or more processors to extract an LPQ histogram from a magnitude of each of the one or more Gabor responses, and obtain a Local Gabor-based Phase Quantization (LGPQ) feature vector. The system can also include a machine learning model trained on feature vectors extracted using the LPQ operator, where the machine learning model takes as input the LGPQ feature vector and generates a score that is compared against a decision threshold to determine if the subject is a male or a female.

In some implementations, the Gabor filter bank includes five different scales and eight different orientations. In some implementations, the LGPQ feature vector is obtained by concatenating one or more LPQ histograms under one or more scales and orientations. In some implementations, the score is a value between 0 and 1.

In some implementations, the encode operation includes applying the LPQ operator on a Gabor magnitude of each Gabor response to encode variations of a corresponding Gabor response. In some implementations, the machine learning model is a linear-kernel support vector machine (SVM).

In some implementations, the encoding, extracting, and obtaining operations further include instructions to cause the one or more processors to: examine phase information generated using a Short-Term Fourier Transform (STFT) and the LPQ operator, and, as a result of a quantization process of real and imaginary parts of Fourier coefficients, generate eight binary labels represented as gray level intensities, wherein intensities from one or more positions contribute to construction of a feature vector including an LPQ 256-bin histogram. In some implementations, the gray level intensities include values between 0 and 255.

In some implementations, the LPQ operator includes an LPQ spatial window defined according to a radius R. In some implementations, each LPQ histogram is extracted under a specific scale and a specific orientation.

Some implementations can include a non-transitory computer readable medium having instructions stored therein that, when executed by one or more processors, cause the one or more processors to perform a method to classify a subject as male or female based on gait. The method can include extracting a representative feature vector by convolving Gait Energy Image (GEI) images with a Gabor filter bank to generate one or more Gabor responses, and encoding high order texture information of the one or more Gabor responses using a local phase quantization (LPQ) operator. The method can also include extracting an LPQ histogram from a magnitude of each of the one or more Gabor responses, and obtaining a Local Gabor-based Phase Quantization (LGPQ) feature vector. The method can further include training a machine learning model on feature vectors extracted using the LPQ operator, where the machine learning model takes as input the LGPQ feature vector and generates a score that is compared against a decision threshold to determine if the subject is a male or a female.

In some implementations, the encoding includes applying the LPQ operator on a Gabor magnitude of each Gabor response to encode variations of a corresponding Gabor response. In some implementations, the machine learning model is a linear-kernel support vector machine (SVM).

In some implementations, the encoding, extracting, and obtaining operations further include: examining phase information generated using a Short-Term Fourier Transform (STFT) and the LPQ operator, and, as a result of a quantization process of real and imaginary parts of Fourier coefficients, generating eight binary labels represented as gray level intensities, wherein intensities from one or more positions contribute to construction of a feature vector including an LPQ 256-bin histogram.

Some implementations can include a method to classify a subject as male or female based on gait. The method can include extracting a representative feature vector by convolving Gait Energy Image (GEI) images with a Gabor filter bank to generate one or more Gabor responses, and encoding high order texture information of the one or more Gabor responses using a local phase quantization (LPQ) operator. The method can also include extracting an LPQ histogram from a magnitude of each of the one or more Gabor responses, and obtaining a Local Gabor-based Phase Quantization (LGPQ) feature vector. The method can further include training a machine learning model on feature vectors extracted using the LPQ operator, where the machine learning model takes as input the LGPQ feature vector and generates a score that is compared against a decision threshold to determine if the subject is a male or a female.

In some implementations, the Gabor filter bank includes five different scales and eight different orientations. In some implementations, the LGPQ feature vector is obtained by concatenating one or more LPQ histograms under one or more scales and orientations. In some implementations, the score is a value between 0 and 1. In some implementations, the encode operation includes applying the LPQ operator on a Gabor magnitude of each Gabor response to encode variations of a corresponding Gabor response. In some implementations, the machine learning model is a linear-kernel support vector machine (SVM).

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
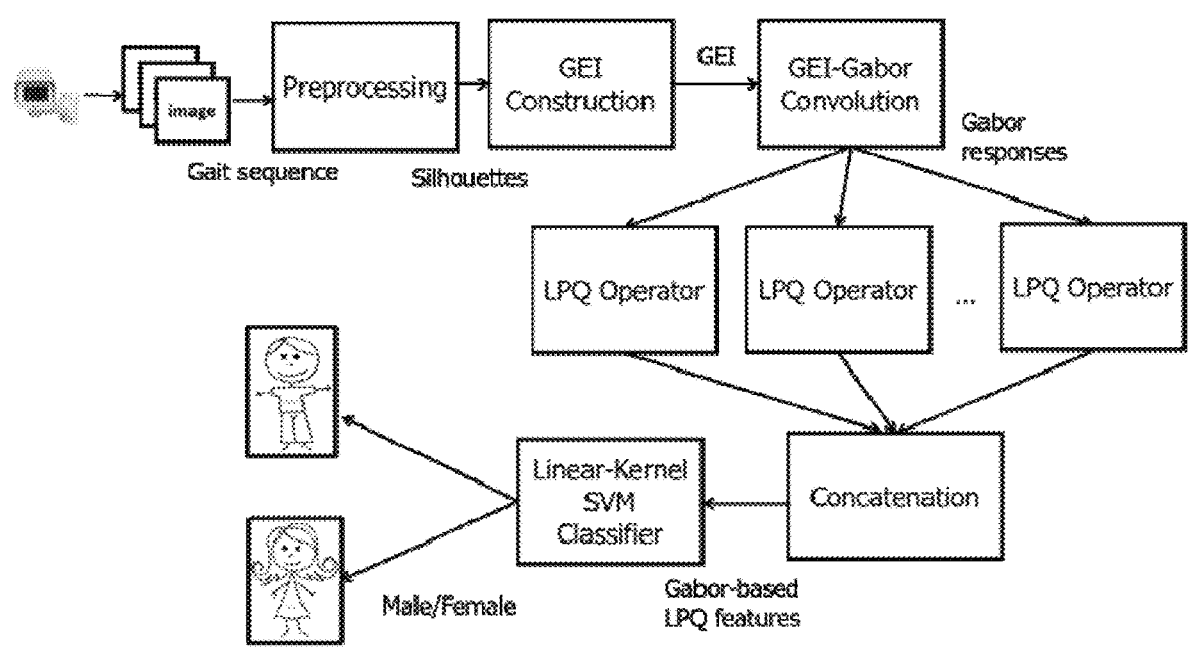
FIG. 1 is a diagram of an example framework to perform gait-based gender recognition in accordance with some implementations.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Some implementations include a Gabor-based local phase quantization (LGPQ) descriptor that encodes the Fourier phase variations of GEI-Gabor responses within a spatial window for each pixel position. First, gait energy image (GEI) is constructed for each gait period to capture the spatial and temporal walking characteristics of a human. The GEI is then convolved with a bank of Gabor filters with five different scales and eight different orientations. Then, the phase variations in Gabor magnitude are encoded using a local phase quantization (LPQ) operator. The LPQ operator quantizes Fourier phases obtained from the four low frequencies coefficients into eight binary labels. This is executed for each pixel position and the results are collected into a histogram. Then, an LGPQ feature vector is obtained by concatenating all LPQ histograms under all scales and orientations. This histogram is used to train a linear-kernel support vector machine (SVM) classifier. The LGPQ descriptor shows better performance than LBP and its well-known variants at various viewing angles and different covariates. The LGPQ descriptor also outperforms Gabor-based LBP (LGBP).

In some implementations, a gait-based gender recognition system can operate in two phases: a training phase and a classification (or testing) phase. Both phases go through several common stages. As shown in FIG. 1, an example workflow of the system starts with the acquisition of human motion (which can be either through a video camera or from pre-stored videos). Next, preprocessing, including silhouette extraction, is performed in which the background is subtracted, and the person's silhouette is formed. Background subtraction aims to separate the static background to enable the focus on moving subjects. The object of interest is isolated and passed into the subsequent component for silhouette formation. The silhouette over a gait cycle is converted into a single image known as gait energy image (GEI). Then, a GEI-Gabor convolution is performed in which the GEI image is convolved with a bank of Gabor filters to generate a robust gait representation. Feature extraction converts the high dimensional Gabor response data into a low-dimensional representative set of features stored as feature vectors. The conversion includes encoding Fourier phase information of the Gabor responses using a local phase quantization (LPQ) operator. During a training phase, the generated feature vectors are stored in a database to be used to train a support vector machine (SVM) with a linear kernel function. Other learning models and associated learning and/or training techniques can be used.

In the classification phase, video of a subject is captured and processed through the stages mentioned above to extract one or more representative feature vectors, which, in turn, can be provided to a trained SVM classifier to generate a score (e.g., between 0 and 1), which is compared against a decision threshold to determine if that subject is a male or a female. An example processing framework for gait-based gender recognition as described herein is shown in FIG. 1. Feature extraction is an important step in the recognition process. Details of an example feature extraction are discussed below.

Gait Energy Image Construction Process

To construct a GEI image, a gait cycle is detected within a complete silhouette sequence. For example, the gait cycle detection algorithm of Wang et al. can be used. (See, Liang Wang, Tieniu Tan, Huazhong Ning, and Weiming Hu. *Silhouette analysis-based gait recognition for human identification*. IEEE Transactions on Pattern Analysis and Machine Intelligence, 25(12):1505-1518, December 2003, which is incorporated herein by reference). Other gait cycle detection techniques can be used.

As a function of time, the aspect ratio of the height and width of the bounding box around the moving silhouette is computed. Then, this function is normalized by subtracting its mean and dividing by its standard deviation. After that, the signal is smoothed with a symmetric average filter and autocorrelation is computed to find the peaks. Finally, the first order derivative is computed to find peak positions. The real period is estimated as the average distance between each pair of consecutive peaks.

Each silhouette is normalized into N×M and then aligned to address the variations in the distance between the camera and the subject. Finally, the binary aligned silhouettes are averaged to construct the GEI image as follows:

$$G(\vec{x}) = \frac{1}{K}\sum_{t=1}^{K} B_t(\vec{x}) \qquad (1)$$

where $\vec{x}=[x_1, x_2]^T$ are the spatial coordinates, K is the number of silhouettes in the sequence; $B_t(\vec{x})$ is the binary silhouette at frame t in the sequence. (See, J. Han and B. Bhanu. *Individual recognition using gait energy image*. IEEE Transactions on Pattern Analysis and Machine Intelligence, 28(2):316-322, 2006, which is incorporated herein by reference).

Convolution Process Using Gabor filters

GEI images are convolved with a Gabor filter bank of five different scales and eight different orientations as:

$$G_{v,\mu}(\vec{x}) = G(\vec{x}) * \psi_{v,\mu}(\vec{x}) \qquad (2)$$

where * represents convolution, $\psi_{v,\mu}(\vec{x})$ represents a 2D Gabor wavelet kernel function at orientation $\mu=0, 1, 2, \ldots, 7$ and scale $v=0, 1, 2, 3, 4$, and $G_{v,\mu}(\vec{x})$ represents the output of the convolution process. The kernel is defined by:

$$\psi_{v,\mu}(\vec{x}) = \frac{\|k_{v,\mu}\|^2}{\sigma^2} e^{-(\|k_{v,\mu}\|^2 \|\vec{x}\|^2 / 2\sigma^2)} \left[ e^{ik_{v,\mu}\vec{x}} - e^{-\sigma^2/2} \right] \qquad (3)$$

where $\|\cdot\|$ represents the Euclidean norm operator, $k_{v,\mu}=k_v e^{i\phi_\mu}$ with $k_v=k_{max}/\lambda^v$, $\lambda=1.2$ is the spacing factor between Gabor wavelets in the frequency domain, and $\phi_\mu=\pi\mu/8$ indicates the orientation where $\mu=0, 1, 2, \ldots, 7$; and $k_{max}=0.35$. (See, M. Lades, J. C. Vorbruggen, J. Buhmann, J. Lange, C. von der Malsburg, R. P. Wurtz, and W. Konen. *Distortion invariant object recognition in the dynamic link architecture*. IEEE Transactions on Computers, 42(3):300-311, 1993, which is incorporated herein by reference).

Each Gabor response is a complex number consisting of: a real part $R_{v,\mu}(\vec{x})$, and an imaginary part $Im_{v,\mu}(\vec{x})$. The magnitude of each response can be utilized, where response magnitude is defined as follows:

$$Mag_{v,\mu}(\vec{x}) = \sqrt{R_{v,\mu}^2(\vec{x}) + Im_{v,\mu}^2(\vec{x})} \quad (4)$$

Figure 2:
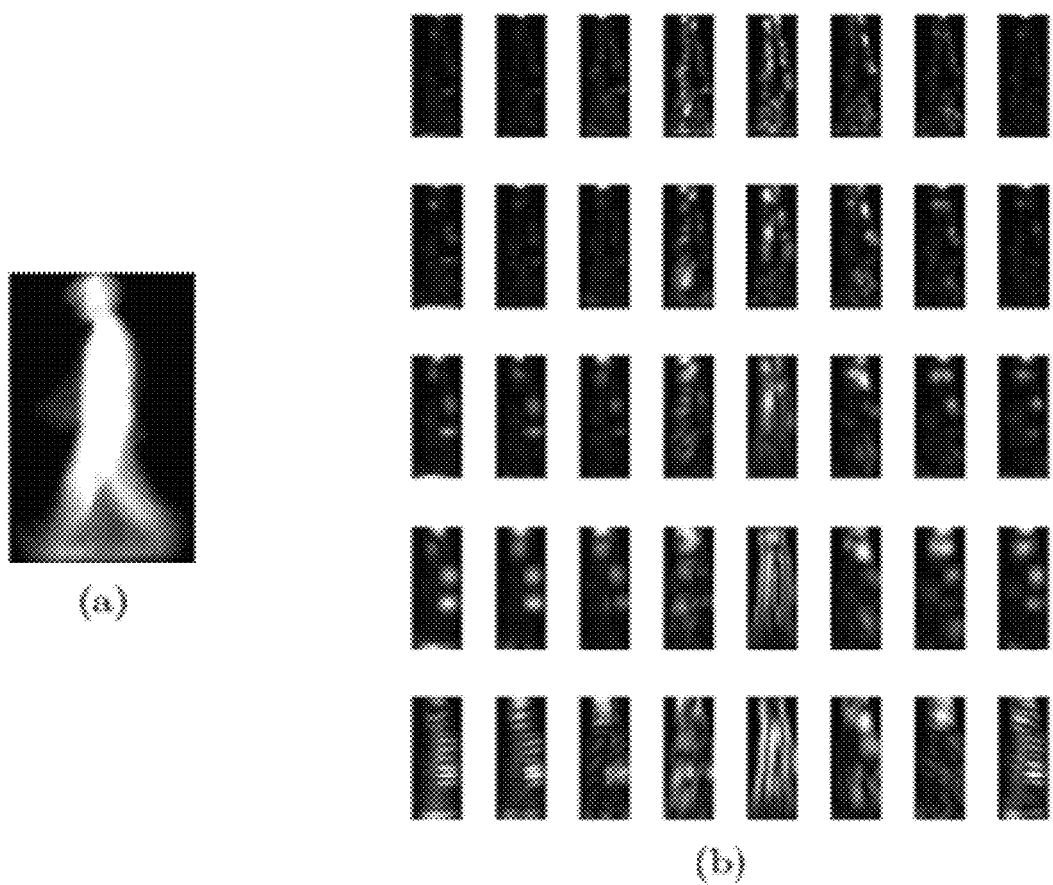
FIG. 2 shows example output of a GEI convolution process in accordance with some implementations.

FIG. 2 shows (a) an example input GEI; and (b) output of the GEI convolution process using a bank of Gabor filters having five different scales (vertical axis) and eight different orientations (horizontal axis).

Local Phase Quantization

Local phase quantization (LPQ) includes an operator that is an LBP variant to analyze image texture based on quantizing the phase information of a local Fourier transform within predefined neighborhoods. LPQ has been applied to a variety of image processing applications such as face recognition. (See, Ville Ojansivu and Janne Heikkila. *Blur Insensitive Texture Classification Using Local Phase Quantization*, pages 236-243. Springer Berlin Heidelberg, 2008, which is incorporated herein by reference). LPQ has proven its efficiency due to its blur-invariance capability and insensitivity to linear illumination changes, which can make it a preferred choice over traditional LBP in some instances.

Similar to the traditional LBP, LPQ has two parameters: the number of samples P and radius R. Although other values are also possible, in experiments described herein, P=8, which is a common choice in the literature. This setting corresponds to the histogram values that are in the range $\{0, \ldots, 255\}$. The parameter R contributes in determining the LPQ spatial window dimensions, given as D=2R+1, and the lowest non-zero frequency parameter a, given as a=1/D.

LPQ examines the phase information generated using the Short-Term Fourier Transform (STFT) computed at each pixel position $\vec{x}$ of a given image $f(\vec{x})$ over a D-by-D block of local neighbors $N_{\vec{x}}$. STFT is defined by:

$$F(\vec{u}, \vec{x}) = \sum_{\vec{y} \in N_{\vec{x}}} f(\vec{y}) e^{-j2\pi \vec{u}^T \vec{y}} \quad (5)$$

where $\vec{u}$ are the vector coordinates in the frequency domain.

For each pixel position, only four local STFT complex coefficients are computed at frequencies: $\vec{u}_1 = [a,0]^T$, $\vec{u}_2 = [0,a]^T$, $\vec{u}_3 = [a,a]^T$, and $\vec{u}_4 = [a,-a]^T$. Consequently, a vector is generated for each pixel position:

$$F(\vec{x}) = [F(\vec{u}_1,\vec{x}), F(\vec{u}_2,\vec{x}), F(\vec{u}_3,\vec{x}), F(\vec{u}_4,\vec{x})] \quad (6)$$

Each component in $F(\vec{x})$ is examined to capture the phase information by testing the real and imaginary parts for each STFT coefficient through a simple scalar quantization as follow:

$$b_k = \begin{cases} 1, & C_k > 0 \\ 0, & \text{otherwise} \end{cases} \quad (7)$$

where is the kth component in $[\text{Re}\{F(\vec{x})\}, \text{Im}\{F(\vec{x})\}]$.

As a result of the quantization process of the real and imaginary parts of the Fourier coefficients, eight binary labels $b_k$ are generated and represented as gray level intensities between 0 and 255 as follows:

$$f_{LPQ} = \sum_{k=0}^{7} b_k 2^k \quad (8)$$

Then, one or more values from one or more positions (e.g., all values from all positions) contribute to the construction of the LPQ 256-bin histogram which is used as a feature vector.

The LPQ operator can be applied on a Gabor magnitude of each response to encode their variations. An LPQ histogram is constructed for each Gabor response and then the histograms are merged together linearly to form the final feature vector. The resulting operator is a Local Gabor-based Phase Quantization (LGPQ). Applying the LGPQ descriptor can help capture more informative and discriminating gait-based features for gender recognition purposes, which is achieved by encoding the high order texture information obtained from Gabor domain using the LPQ operator.

The binary label of a specific pixel position $\vec{x}$ extracted from the magnitude of a Gabor response at scale v and orientation $\mu$ is formulated as follows:

$$LGPQ_{v,\mu}^R(\vec{x}) = LPQ_{v,\mu}^R(Mag_{v,\mu}(\vec{x})) \quad (9)$$

where $LPQ_{v,\mu}^R(x)$ denotes the LPQ for a single pixel position $\vec{x}$ at scale v and orientation $\mu$, $LGPQ_{v,\mu}^R(\vec{x})$ denotes the resulting Gabor-based LPQ at pixel position $\vec{x}$ at scale v and orientation $\mu$, $Mag_{v,\mu}(\vec{x})$ denotes the Gabor magnitude at pixel position $\vec{x}$ and using scale v and orientation $\mu$.

One LPQ histogram is extracted from the magnitude of each GEI-Gabor response under specific scale and orientation. Finally, an LGPQ feature vector is obtained by concatenating LPQ histograms under one or more scales and orientations (e.g., all scales and orientations).

Experiments and Results

Gait Database

The CASIA B database is collected at the Institute of Automation, Chinese Academy of Sciences (CASIA) to provide a benchmark database for gait studies and related research problems. (See, Shiqi Yu, Daoliang Tan, and Tieniu Tan. *A framework for evaluating the effect of view angle, clothing and carrying condition on gait recognition*. In Proceedings of the 18th International Conference on Pattern Recognition (ICPR), volume 4, pages 441-444, 2006, which is incorporated herein by reference). It comprises 13640 gait sequences belonging to 124 subjects of different genders (93 males and 31 females). The focus is to capture human walking using 11 cameras at equally spaced viewing angles. For each subject, there are 110 video sequences obtained from walking 10 times through a straight line on concrete ground as follows: 6 normal walking, 2 while wearing a coat, 2 while carrying a bag. Consequently, videos of all subjects and sequences for each subject give 110×124=13640 sequences in total.

Experimental Setup

The CASIA B database was divided into four training and testing sets for both male and female. For training, one Gallery (training) Set G is specified as four samples of each subject (male/female) while normally walking. The remaining two normal walking sequences are utilized as Probe (testing) Set A. The two sequences for subjects walking with a bag and a coat form the Probe Sets B and C, respectively.

The parameters for LPQ operator are R=2, D=5, a=1/5. The disclosed method was compared with the traditional LBP operator with parameters R=1 and P=8.

Results

The performance of the disclosed LGPQ descriptor was tested against different viewing angles and different walking conditions. As mentioned above in the experimental setup section, the linear-kernel SVM was first trained using the Gallery Set G. In the classification phase, the three Probe Sets A, B, and C are used to test the SVM model. The accuracy metric is typically used to evaluate the performance. However, in this case and due to the imbalance in the dataset of more males than females, it was more effective to use the area under the curve (AUC) of the receiver operating characteristic (ROC) and F1 score as performance metrics. Higher values of these metrics indicate better performance of the gait-based gender recognition technique. F1 score is the harmonic mean of the precision and recall and is given as:

$$F_1 = 2 \cdot \frac{\text{Precision} \times \text{Recall}}{\text{Precision} + \text{Recall}} \qquad (10)$$

LGPQ descriptor performance as a gait-based gender recognition method was evaluated against the classical LBP operator and several of its well-known extensions: LXP, LTP, and LPQ. (See, H. P. Mohan Kumar and H. S. Nagendraswamy. *LBP for gait recognition: A symbolic approach based on GEI plus RBI of GEI*. In International Conference on Electronics and Communication Systems (ICECS), pages 1-5, 2014; B. Zhang, S. Shan, X. Chen, and W. Gao. *Histogram of Gabor phase patterns (HGPP): A novel object representation approach for face recognition*. IEEE Transactions on Image Processing, 16(1):57-68, 2007; and K. B. Low and U. U. Sheikh. *Gait recognition using local ternary pattern (LTP)*. In IEEE International Conference on Signal and Image Processing Applications, pages 167-171, 2013, which are incorporated herein by reference). These methods were applied directly on the GEI image without involving Gabor filters. In addition, LGPQ is compared with the Gabor-based LBP (LGBP). (See, Wenchao Zhang, Shiguang Shan, Wen Gao, Xilin Chen, and Hongming Zhang. *Local Gabor binary pattern histogram sequence (LGBPHS): a novel non-statistical model for face representation and recognition*. In Tenth IEEE International Conference on Computer Vision ICCV, volume 1, pages 786-791, 2005, which is incorporated herein by reference).

Tables 1, 2 and 3 set forth the performance of LGPQ in term of F1 score at various viewing angles and for the three different walking conditions: Probe Set A (walking normally), Probe Set B (walking with bag) and Probe Set C (walking with coat), respectively. Similarly, Tables 4, 5 and 6 set forth the behavior of LGPQ using the AUC measure. Obviously, in the case of non-Gabor methods, LGPQ improves the performance in terms of F1 and AUC for all tested angles and different covariates. Moreover, LGPQ outperforms the Gabor-based LBP method under most of the viewing angles and in the case of the three covariates.

When subjects are walking normally, LGPQ achieved the highest performance compared to walking with a bag or coat. Normal walking causes the lowest deformity in the human body shape during walking which can make it easier for LGPQ to capture the basic discriminative features originated from the normal walking. Moderate performance is achieved in the case of walking with a bag. The bag can occupy a region in the middle of the human body and can cause a higher degree of deformity for that part of body during walking. The largest degree of deformity of the human body occurs when the subject is walking and wearing a coat which makes it the most difficult and hardest scenario to extract distinguishing features to recognize gender.

From the reported experimental results describe herein, the LGPQ descriptor was found to be efficient and effective at capturing robust distinguishing gait information for human gender recognition.

TABLE 1

Evaluation and comparison of F1 for LGPQ and other methods under Normal-Walking covariate

| Method | 0° | 18° | 36° | 54° | 72° | 90° | 108° | 126° | 144° | 162° | 180° |
|---|---|---|---|---|---|---|---|---|---|---|---|
| GEI + LXP | 87.50 | 91.80 | 93.30 | 92.20 | 91.10 | 84.20 | 89.30 | 87.20 | 89.90 | 89.70 | 93.30 |
| GEI + LBP | 86.20 | 91.60 | 90.60 | 89.70 | 850 | 85.80 | 86.40 | 87.10 | 91.60 | 90.50 | 88.30 |
| GEI + LTP | 86.70 | 85.30 | 88.30 | 85.10 | 88.70 | 80 | 83.80 | 83.80 | 87.70 | 86 | 88.30 |
| GEI + LPQ | 94 | 92.80 | 91.70 | 87.90 | 93.50 | 93 | 87 | 91 | 92.60 | 93.50 | 94.80 |
| LGBP | 97.20 | 95.60 | 96 | 96.40 | 98.80 | 98.40 | 98.40 | 96.30 | 96.70 | 95.50 | 98.80 |
| LGPQ | 97.60 | 98.40 | 99.20 | 97.50 | 99.20 | 99.60 | 99.60 | 100 | 98.80 | 99.60 | 99.60 |

TABLE 2

Evaluation and comparison of F1 for LGPQ and other methods under Carrying-Bag covariate

| Method | 0° | 18° | 36° | 54° | 72° | 90° | 108° | 126° | 144° | 162° | 180° |
|---|---|---|---|---|---|---|---|---|---|---|---|
| GEI + LXP | 84.10 | 79.50 | 77 | 68.70 | 67.50 | 72.80 | 72.50 | 74.70 | 85.30 | 84.70 | 82.20 |
| GEI + LBP | 84.30 | 74.40 | 73.30 | 70.90 | 72.30 | 78.90 | 76.90 | 74.60 | 82.10 | 85.70 | 80.20 |
| GEI + LTP | 78.30 | 78.40 | 81.40 | 71.10 | 73 | 69.70 | 66 | 75.20 | 72.50 | 78.30 | 86.10 |
| GEI + LPQ | 86.10 | 82.70 | 83 | 84.10 | 83 | 87.80 | 78 | 85.40 | 88.30 | 87.80 | 88.40 |
| LGBP | 90.20 | 82.80 | 87 | 87 | 81.80 | 89.60 | 89.80 | 88.20 | 93.10 | 90.20 | 93 |
| LGPQ | 94.30 | 87.80 | 93.70 | 94.20 | 85.40 | 94.70 | 91 | 91.30 | 98.40 | 95.90 | 97.20 |

TABLE 3

Evaluation and comparison of F1 for LGPQ and other methods under Wearing-Coat covariate

| Method | 0° | 18° | 36° | 54° | 72° | 90° | 108° | 126° | 144° | 162° | 180° |
|---|---|---|---|---|---|---|---|---|---|---|---|
| GEI + LXP | 78.70 | 83.60 | 75 | 81.40 | 79.30 | 79.90 | 76.90 | 83.10 | 81.30 | 74.60 | 80.10 |
| GEI + LBP | 79.30 | 74.70 | 70.30 | 85.30 | 74.70 | 75.80 | 77.40 | 78.60 | 78.90 | 78 | 79.80 |
| GEI + LTP | 75.20 | 82.90 | 72.30 | 72.10 | 79.40 | 72.90 | 75.20 | 77.40 | 72.20 | 67.10 | 78.30 |
| GEI + LPQ | 78.70 | 80.30 | 86.40 | 78.40 | 80.10 | 77.50 | 79.20 | 77.50 | 81 | 84.60 | 85.40 |
| LGBP | 80.80 | 90.60 | 85.10 | 86 | 80.10 | 81.60 | 80.70 | 85.20 | 85.40 | 86.40 | 89.90 |
| LGPQ | 84.60 | 92.20 | 91.50 | 86.80 | 77.90 | 81.90 | 86.90 | 86.80 | 87.70 | 91.60 | 93.40 |

TABLE 4

Evaluation and comparison of AUC for LGPQ and other methods under Normal-Walking covariate

| Method | 0° | 18° | 36° | 54° | 72° | 90° | 108° | 126° | 144° | 162° | 180° |
|---|---|---|---|---|---|---|---|---|---|---|---|
| GEI + LXP | 87.10 | 93.30 | 94.40 | 88.40 | 87.60 | 78.80 | 83.90 | 81.50 | 86.30 | 87.60 | 93.30 |
| GEI + LBP | 84.10 | 89 | 90.90 | 84.70 | 81.70 | 80.40 | 80.40 | 85.80 | 89.50 | 88.70 | 87.60 |
| GEI + LTP | 80.10 | 79.60 | 84.70 | 78.50 | 82.50 | 71.50 | 78 | 78 | 82.30 | 82 | 84.70 |
| GEI + LPQ | 92.20 | 90.90 | 87.10 | 83.90 | 90.30 | 89.50 | 84.70 | 86.60 | 88.20 | 91.40 | 93.80 |
| LGBP | 96 | 94.40 | 95.70 | 95.40 | 98.70 | 97.30 | 97.80 | 93.80 | 94.10 | 92.20 | 98.10 |
| LGPQ | 96.80 | 97.30 | 98.90 | 95.20 | 98.90 | 99.20 | 99.70 | 100 | 98.10 | 99.20 | 99.20 |

TABLE 5

Evaluation and comparison of AUC for LGPQ and other methods under Carrying-Bag covariate

| Method | 0° | 18° | 36° | 54° | 72° | 90° | 108° | 126° | 144° | 162° | 180° |
|---|---|---|---|---|---|---|---|---|---|---|---|
| GEI + LXP | 83.10 | 80.60 | 80.40 | 66.90 | 65.10 | 67.20 | 65.60 | 75.50 | 81.50 | 86 | 84.10 |
| GEI + LBP | 81.20 | 77.40 | 77.70 | 69.60 | 64.50 | 71.50 | 66.10 | 73.40 | 77.20 | 85.20 | 81.20 |
| GEI + LTP | 68 | 69.40 | 73.40 | 61.80 | 70.70 | 60.20 | 59.90 | 70.40 | 65.60 | 70.20 | 78.80 |
| GEI + LPQ | 83.10 | 82 | 82.30 | 78.20 | 75.50 | 80.90 | 72.60 | 80.10 | 84.10 | 86.30 | 89.20 |
| LGBP | 86 | 77.70 | 82.30 | 84.70 | 83.30 | 87.10 | 88.70 | 87.10 | 90.10 | 86 | 89.50 |
| LGPQ | 90.90 | 83.30 | 89 | 90.30 | 86 | 91.70 | 90.60 | 90.90 | 97.30 | 93.50 | 95.40 |

TABLE 6

Evaluation and comparison of AUC for LGPQ and other methods under Wearing-Coat covariate

| Method | 0° | 18° | 36° | 54° | 72° | 90° | 108° | 126° | 144° | 162° | 180° |
|---|---|---|---|---|---|---|---|---|---|---|---|
| GEI + LXP | 75.50 | 84.70 | 74.20 | 79 | 68.80 | 71 | 65.10 | 76.10 | 74.70 | 73.90 | 79.60 |
| GEI + LBP | 75 | 75 | 72.80 | 81.50 | 64.80 | 64.50 | 65.10 | 71.20 | 74.70 | 78.50 | 79.80 |
| GEI + LTP | 65.60 | 75 | 57.80 | 59.70 | 67.70 | 61 | 64 | 67.70 | 60.80 | 64.20 | 71.50 |
| GEI + LPQ | 75.50 | 81.70 | 85.20 | 68.50 | 68.30 | 64.80 | 70.40 | 64.80 | 71.80 | 81.50 | 86.60 |
| LGBP | 75.30 | 86.30 | 87.40 | 85.50 | 69.10 | 76.30 | 79 | 77.20 | 80.10 | 86.30 | 86.30 |
| LGPQ | 79 | 87.90 | 87.90 | 80.60 | 64.80 | 71.20 | 79.30 | 78.80 | 80.40 | 90.10 | 89.80 |

Figure 3:
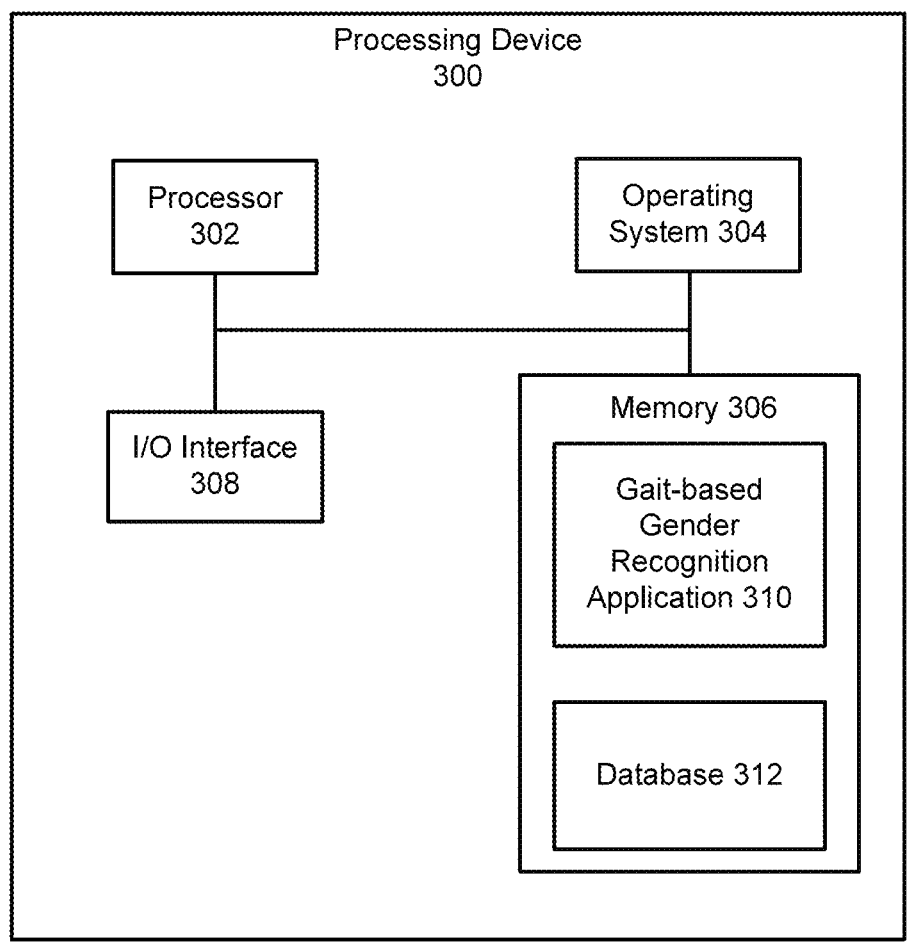
FIG. 3 is a diagram of an example processing device for automatic gender recognition in accordance with some implementations.

FIG. 3 is a block diagram of an example processing device 300 which may be used to implement one or more features described herein. In one example, device 300 may be used to implement a computer device including gait-based gender recognition as described herein, and perform appropriate method implementations described herein. Device 300 can be any suitable computer system, server, or other electronic or hardware device. For example, the device 300 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 300 includes a processor 302, an operating system 304, a memory 306, and input/output (I/O) interface 308.

Processor 302 can be one or more processors and/or processing circuits to execute program code and control basic operations of the device 300. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 306 is typically provided in device 300 for access by the processor 302, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 302 and/or integrated therewith. Memory 306 can store software operating on the device 300 by the processor 302, including an operating system 304, one or more applications 310, and a database 312. In some implementations, applications 310 can include instructions that enable processor 302 to perform the functions described herein (e.g., in FIG. 1).

For example, application 310 can include gait-based gender recognition as described herein. Any of software in memory 304 can alternatively be stored on any other suitable storage location or computer-readable medium. In addition, memory 304 (and/or other connected storage device(s)) can store machine learning model (e.g., SVM) information, and/or other instructions and data used in the features described herein. Memory 304 and any other type of storage (magnetic disk, optical disk, magnetic tape, or other tangible media) can be considered "storage" or "storage devices."

I/O interface 308 can provide functions to enable interfacing the processing device 300 with other systems and devices. For example, network communication devices, storage devices (e.g., memory and/or database), and input/output devices can communicate via interface 308. In some implementations, the I/O interface 308 can connect to interface devices including input devices (keyboard, pointing device, touchscreen, microphone, camera, scanner, etc.) and/or output devices (display device, speaker devices, printer, motor, etc.).

For ease of illustration, FIG. 3 shows one block for each of processor 302, memory 306, I/O interface 308, and software block 310. These blocks may represent one or more processors or processing circuitries, operating systems, memories, I/O interfaces, applications, and/or software modules. In other implementations, device 300 may not have all of the components shown and/or may have other elements including other types of elements instead of, or in addition to, those shown herein.

In general, a computer that performs the processes described herein can include one or more processors and a memory (e.g., a non-transitory computer readable medium). The process data and instructions may be stored in the memory. These processes and instructions may also be stored on a storage medium such as a hard drive (HDD) or portable storage medium or may be stored remotely. Note that each of the functions of the described embodiments may be implemented by one or more processors or processing circuits. A processing circuit can include a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device.

The processor may contain one or more processors and even may be implemented using one or more heterogeneous processor systems. According to certain implementations, the instruction set architecture of the processor can use a reduced instruction set architecture, a complex instruction set architecture, a vector processor architecture, a very large instruction word architecture. Furthermore, the processor can be based on the Von Neumann model or the Harvard model. The processor can be a digital signal processor, an FPGA, an ASIC, a PLA, a PLD, or a CPLD. Further, the processor can be an x86 processor by Intel or by AMD; an ARM processor, a Power architecture processor by, e.g., IBM; a SPARC architecture processor by Sun Microsystems or by Oracle; or other known CPU architecture.

The functions and features described herein may also be executed by various distributed components of a system. For example, one or more processors may execute the functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

What is claimed is:

1. A system to classify a subject as male or female based on gait, the system comprising:
   a camera configured to capture video of the subject;
   one or more processors coupled to the camera and a nontransitory computer readable storage having software instructions stored thereon configured to cause the one or more processors to:
   extract a representative feature vector by convolving Gait Energy Image (GEI) images with a Gabor filter bank to generate one or more Gabor responses;

encode high order texture information of the one or more Gabor responses using a local phase quantization (LPQ) operator;

extract an LPQ histogram from a magnitude of each of the one or more Gabor responses; and obtain a Local Gabor-based Phase Quantization (LGPQ) feature vector; and a machine learning model trained on feature vectors extracted using the LPQ operator, where the machine learning model takes as input the LGPQ feature vector and generates a score that is compared against a decision threshold to determine if the subject is a male or a female.

2. The system of claim 1, wherein the Gabor filter bank includes five different scales and eight different orientations.

3. The system of claim 1, wherein the LGPQ feature vector is obtained by concatenating one or more LPQ histograms under one or more scales and orientations.

4. The system of claim 1, wherein the score is a value between 0 and 1.

5. The system of claim 1, wherein the encode operation includes applying the LPQ operator on a Gabor magnitude of each Gabor response to encode variations of a corresponding Gabor response.

6. The system of claim 1, wherein the machine learning model is a linear-kernel support vector machine (SVM).

7. The system of claim 1, wherein the encoding, extracting, and obtaining operations further include instructions to cause the one or more processors to:

examine phase information generated using a Short-Term Fourier Transform (STFT) and the LPQ operator, and as a result of a quantization process of real and imaginary parts of Fourier coefficients, generate eight binary labels represented as gray level intensities, wherein intensities from one or more positions contribute to construction of a feature vector including an LPQ 256-bin histogram.

8. The system of claim 7, wherein the gray level intensities include values between 0 and 255.

9. The system of claim 1, wherein the LPQ operator includes an LPQ spatial window defined according to a radius R.

10. The system of claim 1, wherein each LPQ histogram is extracted under a specific scale and a specific orientation.

11. A non-transitory computer readable medium having instructions stored therein that, when executed by one or more processors, cause the one or more processors to perform a method to classify a subject as male or female based on gait, the method comprising:

extracting a representative feature vector by convolving Gait Energy Image (GEI) images with a Gabor filter bank to generate one or more Gabor responses;

encoding high order texture information of the one or more Gabor responses using a local phase quantization (LPQ) operator;

extracting an LPQ histogram from a magnitude of each of the one or more Gabor responses;

obtaining a Local Gabor-based Phase Quantization (LGPQ) feature vector; and training a machine learning model on feature vectors extracted using the LPQ operator, where the machine learning model takes as input the LGPQ feature vector and generates a score that is compared against a decision threshold to determine if the subject is a male or a female.

12. The non-transitory computer readable medium of claim 11, wherein the encoding includes applying the LPQ operator on a Gabor magnitude of each Gabor response to encode variations of a corresponding Gabor response.

13. The non-transitory computer readable medium of claim 11, wherein the machine learning model is a linear-kernel support vector machine (SVM).

14. The non-transitory computer readable medium of claim 11, wherein the encoding, extracting, and obtaining operations further include:

examining phase information generated using a Short-Term Fourier Transform (STFT) and the LPQ operator, and as a result of a quantization process of real and imaginary parts of Fourier coefficients, generating eight binary labels represented as gray level intensities, wherein intensities from one or more positions contribute to construction of a feature vector including an LPQ 256-bin histogram.

* * * * *